(12) United States Patent
Kohio

(10) Patent No.: US 11,000,965 B2
(45) Date of Patent: May 11, 2021

(54) ARRANGEMENT FOR TRANSFERRING FLUID TO GUIDE BAR OF CHAIN SAW

(71) Applicant: Ponsse Oyj, Vieremä (FI)

(72) Inventor: Toni Kohio, Kuopio (FI)

(73) Assignee: PONSSE OYJ, Vieremä (FI)

( * ) Notice: Subject to any disclaimer, the term of this patent is extended or adjusted under 35 U.S.C. 154(b) by 368 days.

(21) Appl. No.: 15/764,178

(22) PCT Filed: Sep. 28, 2016

(86) PCT No.: PCT/FI2016/050675
§ 371 (c)(1),
(2) Date: Mar. 28, 2018

(87) PCT Pub. No.: WO2017/055687
PCT Pub. Date: Apr. 6, 2017

(65) Prior Publication Data
US 2018/0272554 A1    Sep. 27, 2018

(30) Foreign Application Priority Data
Sep. 30, 2015   (FI) ...................................... 20155691

(51) Int. Cl.
*B27B 17/00*   (2006.01)
*B27B 17/12*   (2006.01)
(Continued)

(52) U.S. Cl.
CPC ............ *B27B 17/12* (2013.01); *A01G 23/091* (2013.01); *B27B 17/02* (2013.01); *B27B 17/14* (2013.01);
(Continued)

(58) Field of Classification Search
CPC .... A01G 23/08; A01G 23/091; A01G 23/095; B27B 17/00; B27B 17/02; B27B 17/12; B27B 17/14
(Continued)

(56) References Cited

U.S. PATENT DOCUMENTS 2,184,461 A * 12/1939 Mall ....................... B27B 17/12
                                                                30/385
2,748,810 A    6/1956 Strunk
(Continued)

FOREIGN PATENT DOCUMENTS

CN    101555892 A    10/2009
CN    104070232 A    10/2014
(Continued)

OTHER PUBLICATIONS

The extended European Search Report dated Apr. 23, 2019, by the European Patent Office in corresponding European Application No. 16850440.5. (11 pages).
(Continued)

*Primary Examiner* — Adam J Eiseman
*Assistant Examiner* — Dylan Schommer
(74) *Attorney, Agent, or Firm* — Buchanan Ingersoll & Rooney PC

(57) ABSTRACT

The present disclosure relates to an arrangement for transferring fluid to a guide bar in a chain saw. A channel can extend from a chain saw body to the fastening arrangement of the guide bar. The channel can include a cavity through the entire channel, a first end of the cavity being connected to a feed channel provided in the chain saw body and a second end thereof to a counter channel provided in the fastening arrangement. The counter channel, in turn, is arranged to extend to the guide bar. The channel is thus arranged to guide fluid flowing in the feed channel provided (Continued)

in the chain saw body through the channel and further through the counter channel provided in the fastening arrangement to the guide bar.

20 Claims, 4 Drawing Sheets

(51) Int. Cl.
*A01G 23/091* (2006.01)
*B27B 17/14* (2006.01)
*F16N 7/00* (2006.01)
*B27B 17/02* (2006.01)
*F16N 21/00* (2006.01)

(52) U.S. Cl.
CPC ................ *F16N 7/00* (2013.01); *F16N 21/00* (2013.01); *F16N 2210/33* (2013.01)

(58) Field of Classification Search
USPC .......................................................... 83/169
See application file for complete search history.

(56) References Cited

U.S. PATENT DOCUMENTS

| | | | | |
|---|---|---|---|---|
| 3,324,971 A | * | 6/1967 | Stihl | ................ B27B 17/12 184/14 |
| 3,457,970 A | | 7/1969 | Locati | |
| 4,223,438 A | * | 9/1980 | Kerrison | ................ B27B 17/12 30/123.4 |
| 4,764,093 A | | 8/1988 | Nagashima | |
| 5,533,432 A | | 7/1996 | Ornberg | |
| 5,603,311 A | * | 2/1997 | Hoerner | ................ B27B 17/02 125/21 |
| 5,987,786 A | | 11/1999 | Gibson et al. | |
| 6,032,373 A | | 3/2000 | Peterson | |
| 6,148,547 A | | 11/2000 | Gibson et al. | |
| 6,182,722 B1 | | 2/2001 | Ornberg | |
| 6,345,447 B1 | * | 2/2002 | Ronkko | ................ B27B 17/14 30/383 |
| 8,707,569 B1 | | 4/2014 | Peterson | |
| 8,844,678 B2 | | 9/2014 | Ilmarinen | |
| 9,299,910 B1 | | 3/2016 | Sparks et al. | |
| 9,364,968 B2 | | 6/2016 | Takahashi | |
| 9,676,115 B2 | | 6/2017 | Takayanagi et al. | |
| 2013/0213741 A1 | | 8/2013 | Ilmarinen | |
| 2014/0290075 A1 | | 10/2014 | Takayanagi et al. | |
| 2015/0059191 A1 | | 3/2015 | Takahashi | |
| 2016/0111627 A1 | | 4/2016 | Hase et al. | |

FOREIGN PATENT DOCUMENTS

| | | |
|---|---|---|
| CN | 104416623 A | 3/2015 |
| EP | 0 847 840 A2 | 6/1998 |
| EP | 2479891 A1 | 7/2012 |
| FI | 101772 B | 8/1998 |
| FI | 115706 B | 6/2005 |
| FI | 20106125 A | 4/2012 |
| FI | 20125354 A | 10/2012 |
| FI | 124810 B | 1/2015 |
| SE | 509610 C2 | 2/1999 |
| WO | WO 2011/155880 A1 | 12/2011 |
| WO | WO 2015/038011 A1 | 3/2015 |
| WO | 2016051023 A1 | 4/2016 |

OTHER PUBLICATIONS

Herranen J-P., "Harvesterin sahalaipan jatkotutkimus ja tuotteistaminen", Diplomityo, Lappeenrannan Teknillinen Yliopisto, Published May 20, 2015, Lappeenranta.

Finish Search Report dated Jan. 17, 2017, by the Finish Patent and Registration Office in corresponding Finish Application No. 20165553. (2 pages).

Written Opinion of the International Searching Authority (PCT/ISA/237) dated Jan. 17, 2017, by the Finish Patent and Registration Office, in corresponding International Application No. PCT/FI2016/050675. (7 pages).

International Search Report (PCT/ISA/210) dated Jan. 17, 2017, by the Finnish Patent Office as the International Searching Authority for International Application No. PCT/FI2016/050675.

Written Opinion (PCT/ISA/237) dated Jan. 17, 2017, by the Finnish Patent Office as the International Searching Authority for International Application No. PCT/FI2016/050675.

International Search Report (PCT/ISA/210) dated Jan. 12, 2017, by the Finnish Patent Office as the International Searching Authority for International Application No. PCT/FI2016/050676.

Written Opinion (PCT/ISA/237) dated Jan. 12, 2017, by the Finnish Patent Office as the International Searching Authority for International Application No. PCT/FI2016/050676.

International Preliminary Report on Patentability (PCT/IPEA/409) dated Dec. 20, 2017, by the Finnish Patent Office as the International Preliminary Examining Authority for International Application No. PCT/FI2016/050676.

Search Report dated Apr. 7, 2016, by the Finnish Patent Office for Application No. 20155692.

Office Action dated Mar. 25, 2020, by the Brazilian Patent Office in corresponding Brazilian Patent Application No. BR112018006105-0. (4 pages).

* cited by examiner

ARRANGEMENT FOR TRANSFERRING FLUID TO GUIDE BAR OF CHAIN SAW

BACKGROUND OF THE INVENTION

The present invention relates to an arrangement in accordance with the preamble of claim 1. The solution in question is particularly well applicable for use in lubricating a chain of a sawing device, particularly in devices for lubricating chains of sawing devices of forest machines.

Forest machines are used for felling, thinning and delimbing trees. The felling and cutting of a tree is generally performed by a sawing device, a chain saw, provided at the harvester head of a forest machine. Hence it is precisely the sawing device that is one of the most critical parts from the point of view of the forest machine operation and its profitability.

In the felling and cutting of trees, the saw chain and the guide bar of the chain saw are in contact with one another when the saw chain travels in the rail on the outer edge of the guide bar. In order to reduce friction and wear caused by sawing and the movement, lubricant is supplied to the saw chain and the guide bar. As the saw chain moves, it spreads the lubricant around the entire guide bar, including the nose sprocket therein.

The chain saws of the disclosed type also use automatic chain tensioning devices. A saw chain needs to be tensioned because it stretches during operation due to heating and dynamical factors, among other things.

The chain tensioner moves the guide bar in the direction of the longitudinal axis of the latter, whereby the saw chain is tensioned as the distance between the guide bar and the chain sprocket increases. Similarly, when sawing is interrupter or terminated, the chain tensioner releases the saw chain from the tensioning.

Due to the fairly complicated mechanics of chain saws, the guiding of the lubricant to the guide bar is problematic. However, different kinds of arrangements are known for guiding the lubricant to the saw chain through the moving components of the tensioner and the fastening parts of the guide bar. An example of devices for lubricating sawing devices of harvesting machines is disclosed in publication FI124810 "Lubricating device for sawing device". The publication describes a lubricating device for sawing device with a container for lubricant and a lubricant pump comprising a pump chamber. The pump according to the publication has a first space and a second space for delivering lubricant to the saw chain of the sawing device through a second channel, the volume of the second space being smaller than the volume of the first space. The pump presses the lubricant through the channel to the saw chain.

In addition, an arrangement in connection with grease lubrication of a saw chain is known from publication FI20106125. The arrangement makes use of pipes, and presses the lubrication grease from a container into a dosing device from where the grease is arranged to be pressed further through the pipes onto the saw chain.

Another used solution is one in which a lead-through for lubricant oil is implemented by opposite transfer channels provided between surfaces that move during the tensioning of the saw chain. The gap between the transfer channels is sealed with an O-ring placed into an oval groove on the surface, the lead-through channel for lubricant oil passing through the middle of the O-ring seal.

The prior art involves, however, several problems. Due to the structure of the saw chain, the lubricant channels, and their lead-throughs in particular, are difficult to seal. Consequently, a lot of lubricating oil in chain saws of forest machines is continuously wasted. This is both an ecological and a financial problem.

SUMMARY OF THE INVENTION

It is thus an object of the invention to develop an arrangement that mostly solves the above-mentioned problems. This object is achieved by an arrangement for transferring fluid to a guide bar of a chain saw that is, in accordance with the present invention, provided with the characteristic features defined in the claims.

The present problems may be solved, in particular, by combining the characteristics as disclosed in the characterizing part of claim 1. Preferred embodiments of the invention are disclosed in the dependent claims.

The invention is based on an idea according to which lubricant or some other fluid may be arranged to be delivered to a saw chain by means of a hollow channel means moving along with a tensioning movement of the guide bar. The device in question is particularly advantageous to seal to a cylindrical channel made to the body of the sawing device. The problem with current solutions, in which an attempt is made to seal a channel provided through oppositely set planar surfaces that glide in relation to another, can now be avoided.

The invention provides considerable advantages. Hence, by providing the conducting channel in a channel provided in the disclosed channel means, the channel means being slidingly connected between the chain saw body and the fastening arrangement of the guide bar, lubricant or some other fluid may be conveyed to the guide bar in a sealed manner along with a tensioning movement directed to the bar.

The solution provides a material lead-through that is more leak-proof and insensitive to gaps during a sliding motion of the guide bar and parts associated therewith.

In addition, the arrangement according to the invention is easy to manufacture because the sealing of the channel means to structures receiving it is easier and more secure to accomplish than in previous solutions.

The solution disclosed here also allows for a longer sliding motion of the guide bar than before, without compromising the tightness of the channel leading from the chain saw body to the guide bar.

Compared to the prior art, the servicing of the channel means according to the invention is clearly significantly easier, because with this construction there is no need to disassemble the slide mechanics of the tensioning mechanism of the chain saw for replacement of seals, for example.

Other advantages provided by the invention are disclosed in the following more detailed description of specific embodiments of the invention.

LIST OF FIGURES

In the following, some preferred embodiments of the invention will be explained in more detail and with reference to the accompanying drawing, in which FIG. 1 is a conceptual view of a forest machine with its harvester head, FIG. 2 shows a harvester head used in a forest machine with its chain saw, FIG. 3 is an axonometric view of a chain saw used in a harvester head, FIG. 4 shows an explosion view of the chain saw according to F FIG. 3.

DETAILED DESCRIPTION OF PREFERRED EMBODIMENTS

The present figures do not show the arrangement for transferring fluid to a guide bar on a chain saw in scale but the figures are schematic, illustrating the general structure and operation of the preferred embodiments. The structural parts shown by reference numbers in the attached figures then correspond to the structural parts marked by reference numbers in this specification.

Figure 1:
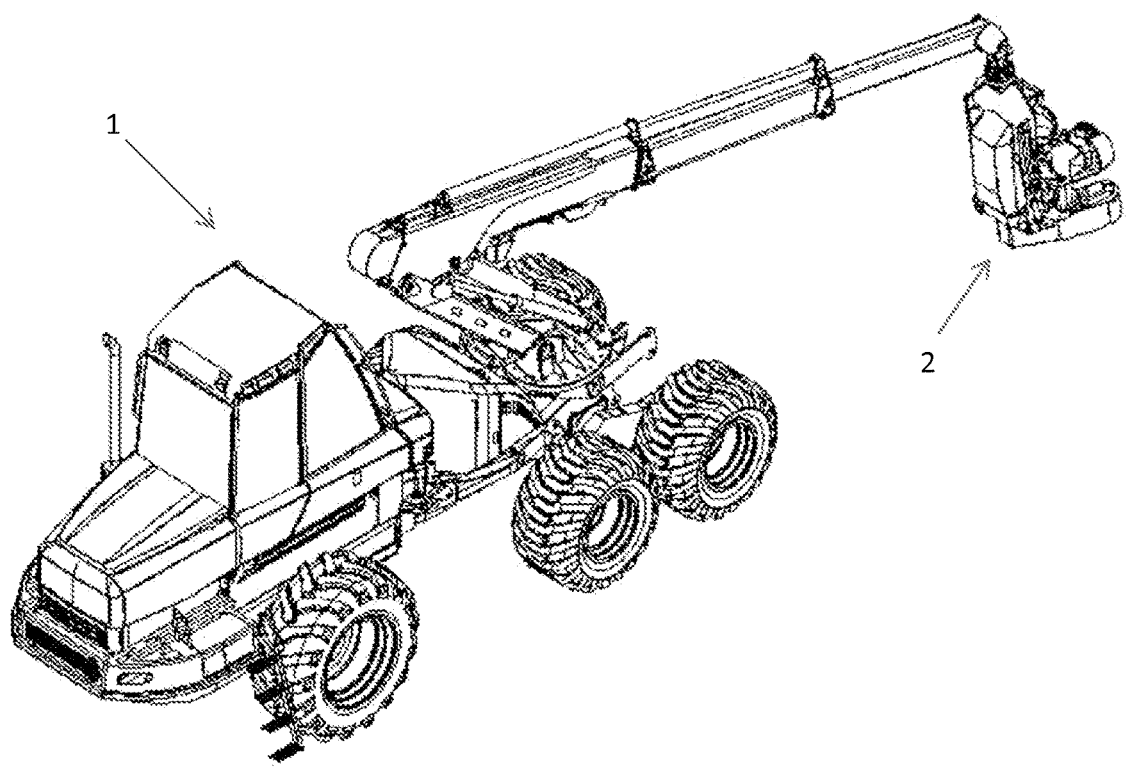

The arrangement disclosed herein relates to a solution with which the fluid in its different states (gaseous, liquid) can be transferred for example through the body of a chain saw 3 provided at a harvester head 2 of a forest machine 1 according to FIG. 1 to a guide bar of the chain saw, or to an immediate vicinity thereof.

Figure 2:
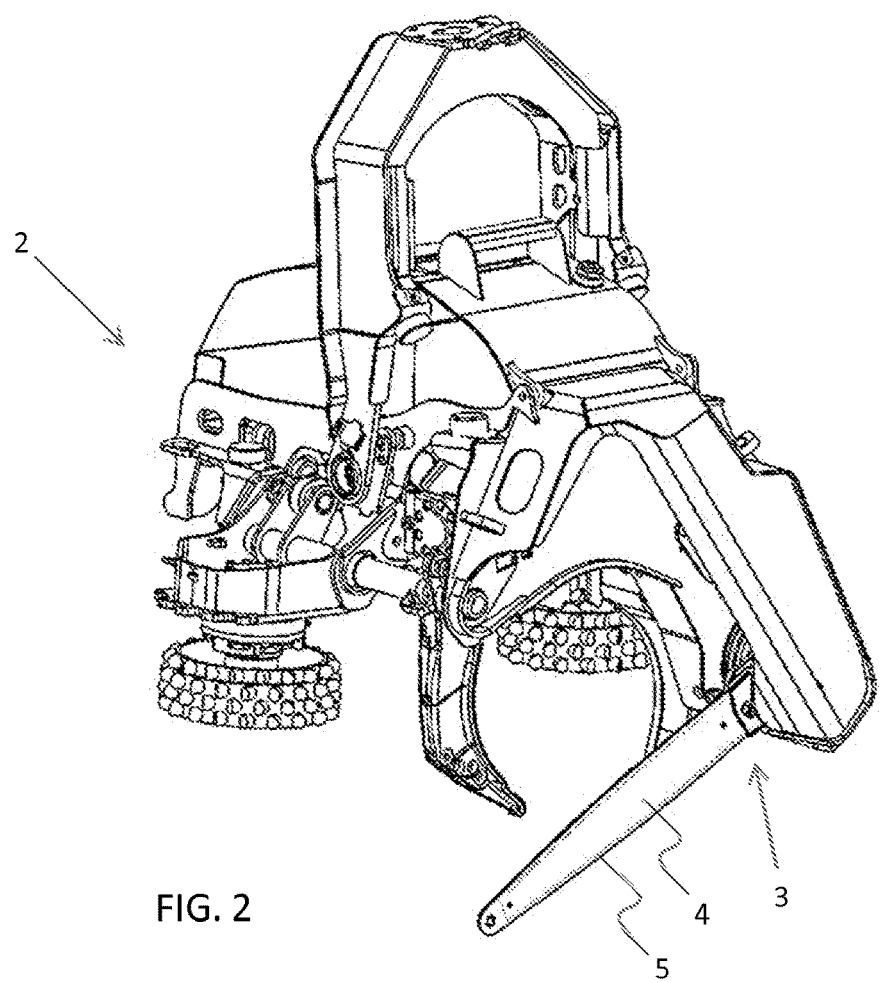
Figure 3:
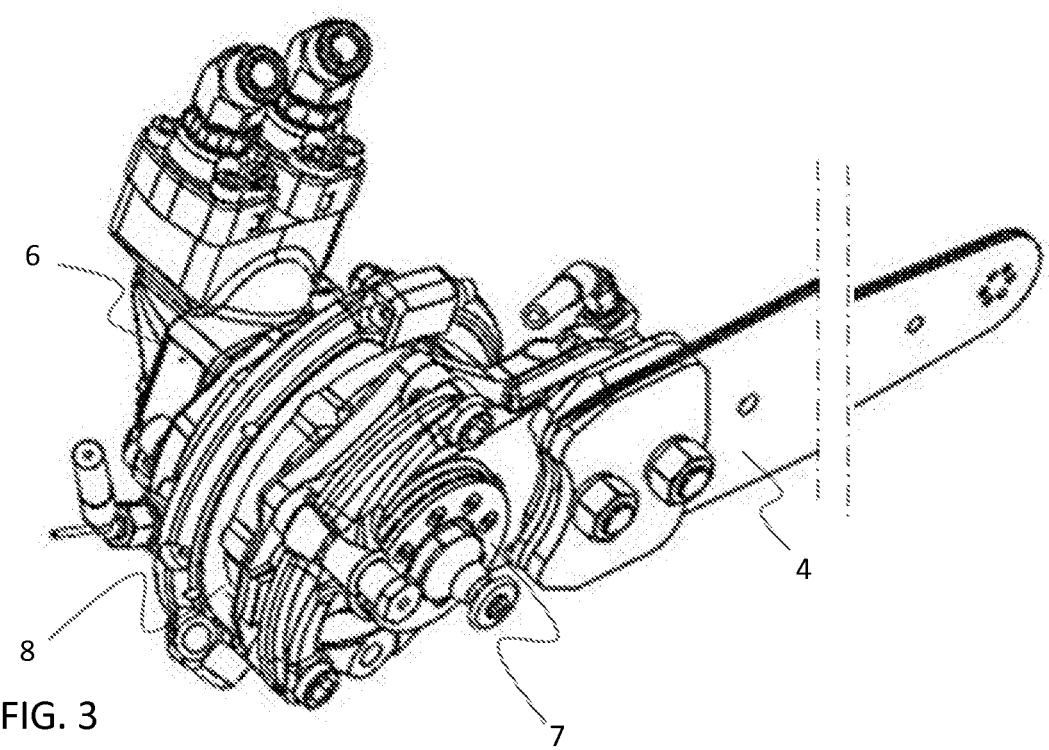
Figure 4:
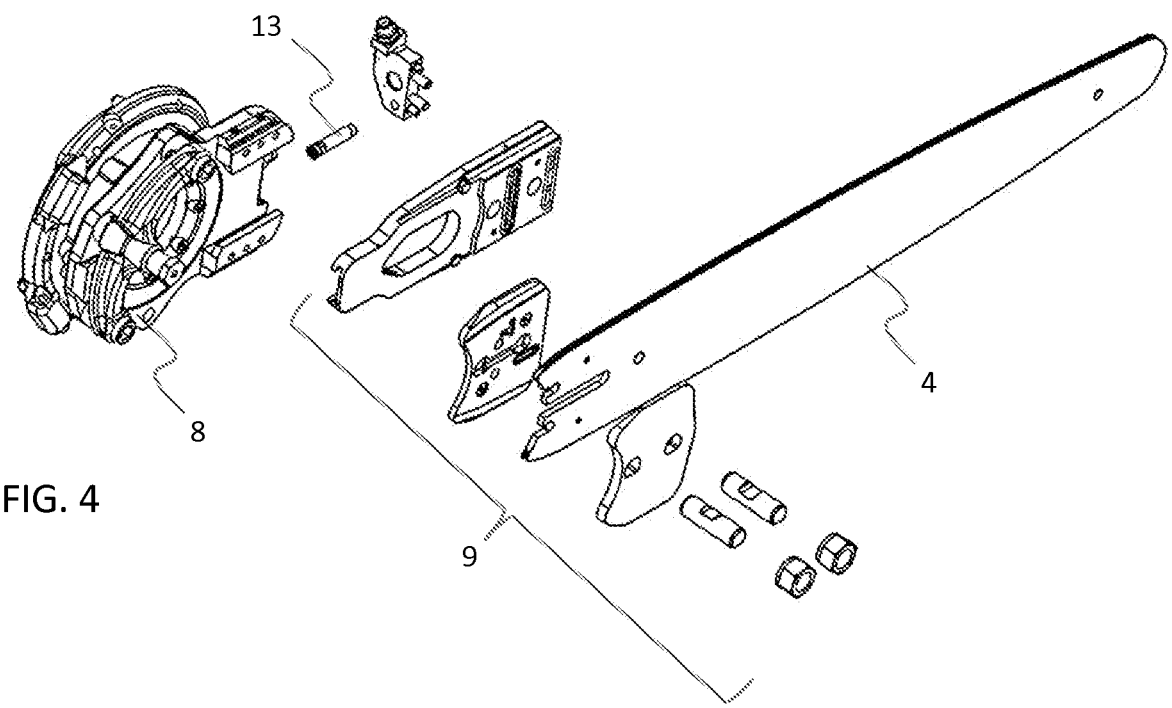
Figure 5:
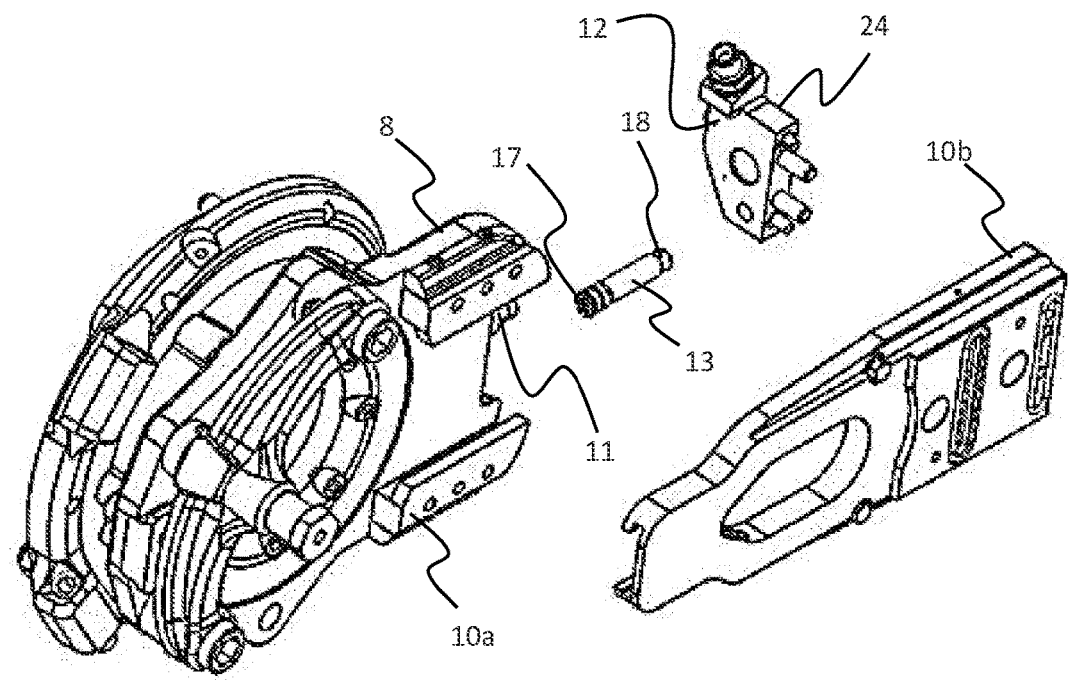
FIG. 5 shows a detail of the chain saw according to FIGS. 3 and 4.

In the following, the disclosed solution is examined particularly in a situation in which lubricant is guided to a saw chain 5 running on a guide bar 4 of the chain saw 3 provided at the harvester head 2 according to FIG. 2. This does not, however, restrict the solution to this technical environment, but the solution is applicable to a number of different purposes of use for transferring a substance that is something else than a standard lubricant.

The essential features of the present arrangement appear from FIGS. 3, 4, 5 and 6, for example. The figures thus show a chain saw 3 comprising a power device 6 arranged to drive a chain sprocket 7. The chain sprocket, in turn, drives a saw chain travelling along the guide bar. The saw chain is not separately shown in the figures. On the whole, chain saw components such as these, which are known per se, are not shown in any further detail, because a person skilled in the art is familiar with them.

The guide bar 4 is rotatably fastened to the chain saw body 8 by means of a fastening arrangement 9 mounted substantially immovably to the guide bar. A tensioning device is further arranged to act on the guide bar fastening arrangement so as to make the guide bar to move in the direction of its longitudinal axis. The tensioning device is not separately shown in the figures. The translational movement is made possible by a slide mechanism 10a and 10b, which also usually attaches the fastening arrangement to the chain saw body 8. As the guide bar moves further outward in relation to the chain sprocket 7 in the direction of its longitudinal axis, i.e. from left to right in the situation shown in the figures, a saw chain that has loosened during sawing may be tensioned against the guide bar.

A tensioning device such as this comprises at least one transfer member 11 arranged to the chain saw body 8 and causing a movement substantially in the direction of the longitudinal axis of the guide bar 4. The transfer member may be discerned behind the slide mechanism 10a in FIG. 5. By allowing the transfer member to be in contact with a counter surface 12 provided in the guide bar or the fastening arrangement 9 thereof, and by directing a force effect to the counter surface, a movement of the guide bar in the direction of the longitudinal axis thereof may be caused. The transfer member may consist of a piston-cylinder arrangement, for example, comprising at least one piston arranged to the chain saw body and causing a movement substantially in the direction of the longitudinal axis of the guide bar. A piston end protruding from the chain saw body is in contact with a counter surface in the fastening arrangement, whereby a thrusting motion of the piston causes a parallel transfer of the guide bar.

In the present solution, the chain saw body 8 is joined to the fastening arrangement by a specific channel means 13. The channel means is further arranged to comprise a cavity 14 piercing the entire means, see FIGS. 6, 7 and 8, a first end of the cavity being connected to a feed channel 15 provided in the chain saw body 8 and a second end thereof to a counter channel 16 provided in the fastening arrangement 9. In a preferred embodiment, the cavity in the channel means extends substantially in a direction of influence of a transfer member 11, thus extending from the chain saw body at a first end 17 to the fastening arrangement at a second end 18. By arranging the counter channel 16 to extend all the way to the guide bar 4, the channel means 13 may be used for supplying fluid flowing in the feed channel provided in the chain saw body through the channel means and the fastening arrangement to the guide bar.

For example, when lubricating the saw chain travelling on the guide bar 4, the lubricant from a lubricant container at the harvester head 2 may be guided by means of a specific pump to the guide bar through a set of channels 15-14-16. In that case, the channel for supplying lubricant from the lubricant container to the guide bar runs through the chain saw body 8, the guide bar fastening arrangement 9 and the guide bar 4 to the saw chain.

Figure 6:
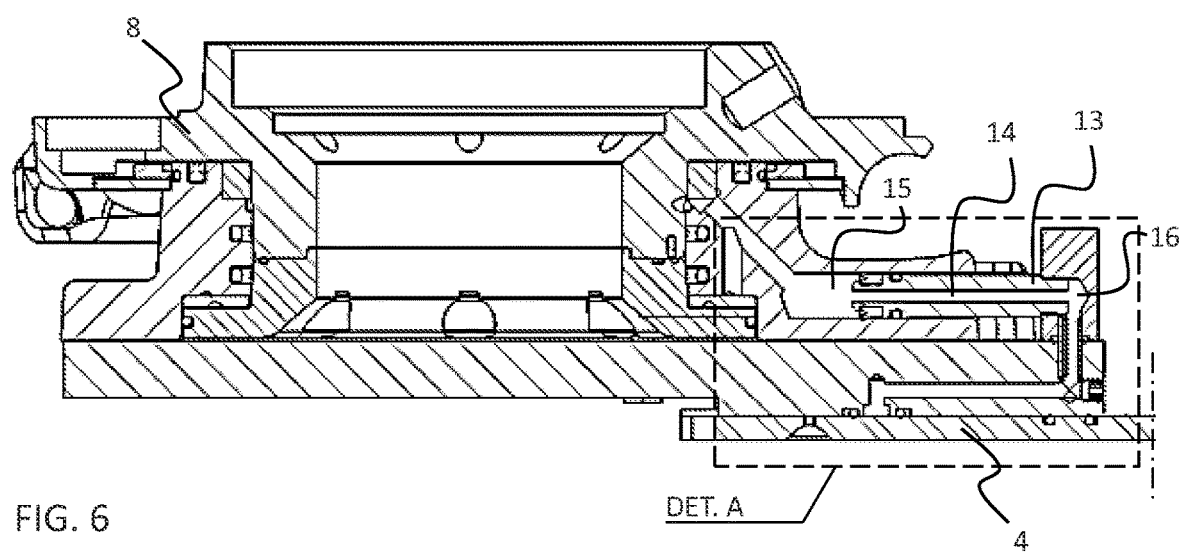
FIG. 6 shows a schematical cross-section of a chain saw according to an exemplary embodiment of the disclosure.
Figure 7:
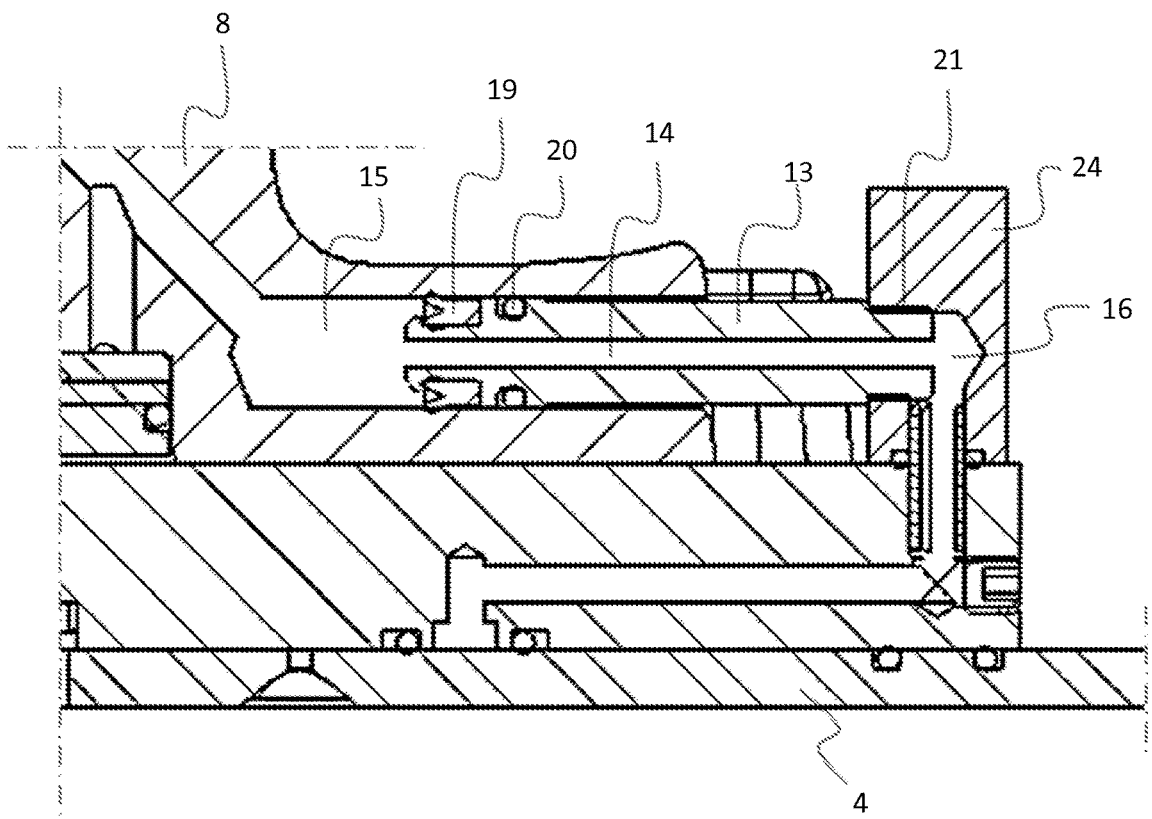
FIG. 7 shows a detail A according to an exemplary embodiment of FIG. 6.
Figure 8:
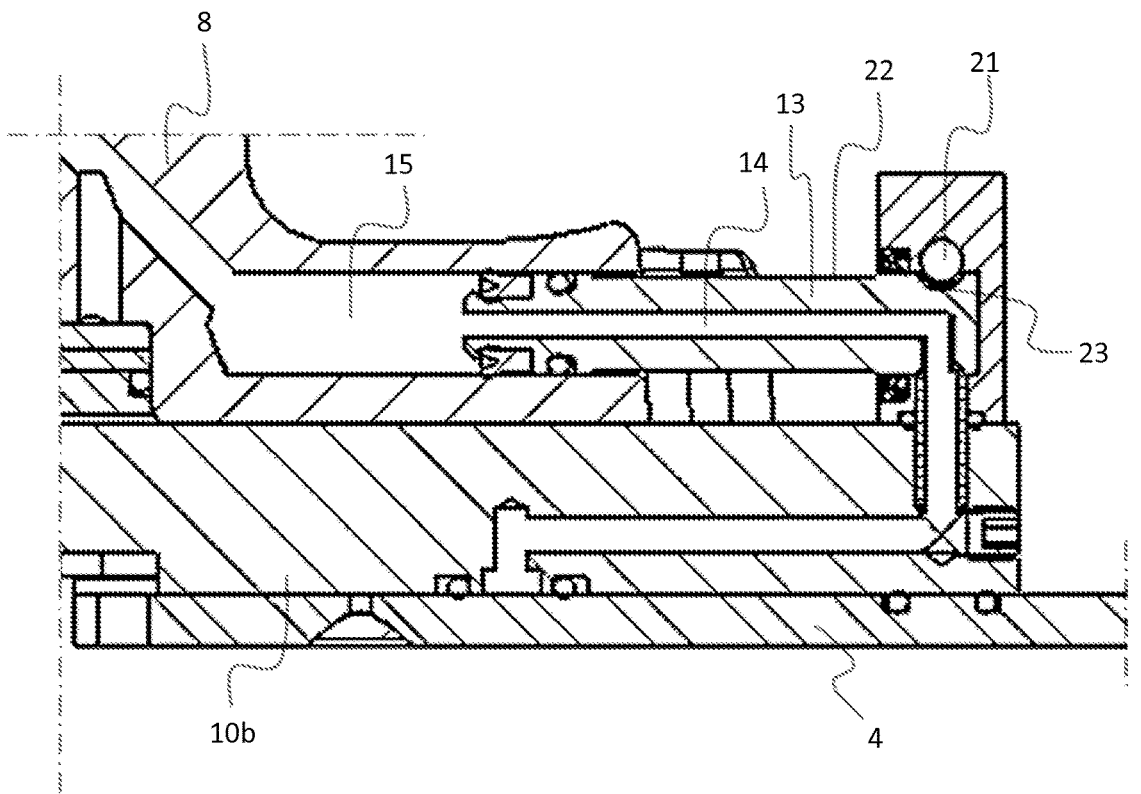
FIG. 8 shows an alternative detail A according to an exemplary embodiment of FIG. 6.

As shown in FIGS. 6, 7 and 8, one end 18 of the channel means 13 may be fastened to the counter channel 16 on the fastening arrangement 9 side. In this type of embodiment, the channel means is arranged to move along with a movement caused by the tensioning device 11 of the saw chain. The first end 17 of the channel means is then arranged to a drilling provided in the chain saw body 8 and forming an outer end of the feed channel 15, where it is allowed to slide while maintaining, at the same time, sufficient tightness of the channels.

Naturally, the first end 17 of the channel means 13 is also attachable substantially immovably to the feed channel 15 at side of the chain saw body 8. In that case, the second end 18 of the channel means in turn is arranged to a drilling provided in the fastening arrangement 9 and forming an outer end of the counter channel 16, where it is able to slide along with a movement caused by the tensioning device 11 while maintaining, at the same time, sufficient tightness of the channels.

In order to achieve sufficient tightness, structural tolerances between the drillings and the channel means may be selected such that a sufficiently clearance-free structure is achieved. However, it is more preferable to provide the channel means 13 with at least one sealing 19, 20 in order to seal the gap 15 or 16 between the channel means and the feed and/or counter channel associated therewith. The seal in question may be an O-ring seal, lip seal or both, for example. See FIG. 7, for example.

The end of channel means 13 that is arranged to be immovable to the chain saw body 8 or to the fastening arrangement 9 comprises means 21 for mechanically locking the channel means in connection with the feed or counter channel. Most preferably, these are formed of a screw thread. See FIG. 7, for example.

The end of the channel means 13 is attachable to the fastening arrangement 9 also by means of a retainer screw co-operating with a groove 23 made to a housing 22 of the channel means. This type of alternative is presented in the attached FIG. 8. The mechanical joint thus provided is preferably sealed separately by a sealing ring. The solution allows for a bigger clearance for the mechanics of the tensioning movement of the saw chain, and being thus stronger in use.

Instead of the end of channel means 13 being immovably arranged to the chain saw body 8 or the fastening arrangement 9, the channel means may be formed as an integral part of the sawing device body or the fastening arrangement.

It is also conceivable that the ends of the feed channel 15 and/or the counter channels 16 does not consist of drillings but tubular members protruding from the chain saw body and/or the fastening arrangement, to the outside or inside of which the channel means is fitted.

Likewise, it is conceivable that the channel means 13 forms from a means that are telescopically deformable. A means of this type is attachable at both ends thereof substantially immovably both to the chain saw body 8 and the fastening arrangement 9. When the saw chain is being tensioned, the length of the channel means will settle in accordance with the travel caused by the tensioning movement, which will maintain a flow connection between the feed channel 15 and the counter channel 16.

Instead of the end of channel means 13 being immovably arranged to the chain saw body 8 or the fastening arrangement 9, the channel means may also be slidingly attached at its ends to the feed channel 15 on the chain saw body side, on the one hand, and to the opposite counter channel 16 of the fastening arrangement, on the other hand. In that case, the channel means preferably comprises one or more limiter members to limit the length of the travel path in the feed channel and/or in the counter channel. A limiter member of this type comprises e.g. a mechanical limiter, more preferably a shoulder in the channel means.

Similarly as above, structural tolerances between the drillings and the channel means may be selected such that a sufficiently clearance-free structure is achieved in order to provide sufficient tightness. However, it is more preferable to provide the channel means with at least one sealing in order to seal the gap between the channel means and the feed and/or counter channel associated therewith. The seal in question may be an O-ring seal, lip seal or both, for example.

In a particular embodiment of the chain saw 3, the present channel means 13 is arranged to form a slide guide, which enables the transfer movement between the chain saw body 8 and the guide bar 4. This provides an advantageous means for reducing the weight of the chain saw.

As is shown in FIGS. 6, 7 and 8, the channel means 13 may be fastened to the fastening arrangement 9 by means of a specific counter piece 24. In this type of embodiment, the channel means joins to at least one counter channel 16 provided in the counter piece, the channel being formed to be further in communication with the guide bar 4. In its preferred embodiment, the same counter piece also forms a counter surface 12 of the transfer member 11. As the longitudinal axis of the channel means is substantially parallel to the direction of the force effect caused by the transfer member, force strains otherwise caused to the channel means may be minimized.

A person skilled in the art will find it obvious that, as technology advances, the basic idea of the invention may be implemented in various ways. The invention and its embodiments are thus not restricted to the above examples but may vary within the scope of the claims.

The invention claimed is:

1. An arrangement for transferring fluid to a guide bar provided in a chain saw, the chain saw having at least a power unit, a chain sprocket driven by the power unit and a saw chain to be rotated along the guide bar thereof, wherein:
   the guide bar includes a fastening arrangement with which it is rotatably fastened to a chain saw body, wherein:
   a tensioning device is arranged to act on the guide bar fastening arrangement, for causing in the guide bar a distancing movement in relation to the chain sprocket in a direction of a longitudinal axis of the guide bar for tensioning the saw chain, wherein:
   the tensioning device includes at least one transfer member arranged to the chain saw body for causing the movement substantially in the direction of the longitudinal axis of the guide bar, the at least one transfer member being in contact with a counter surface on the guide bar or in the fastening arrangement thereof, and wherein:
   the fastening arrangement of the guide bar and the chain saw body are joined by at least one support guide to provide the movement of said guide bar in the direction of the longitudinal axis thereof, wherein the arrangement comprises:
   a channel means configured for extending from the chain saw body to the fastening arrangement of the guide bar of the chain saw body so that
   a direction of a longitudinal axis of the channel means is substantially in a direction of influence of the at least one transfer member of the tensioning device;
   the channel means having a cavity therethrough;
   a first end of said channel means being configured to be connected to a feed channel provided in the chain saw body; and
   a second end of the channel means being configured to be connected to a counter channel provided in the fastening arrangement, the counter channel being arranged to extend into connection with the guide bar; whereby
   the channel means is slidingly arranged by ends thereof either to the feed channel in the chain saw body or the counter channel in the fastening arrangement, and
   the channel means is arranged to guide fluid flowing in the feed channel provided in the chain saw body through the channel means and to the guide bar through the counter channel provided in the fastening arrangement.

2. An arrangement as claimed in claim 1, wherein at its first end the channel means is attached substantially immovably to the feed channel at the chain saw body side.

3. An arrangement as claimed in claim 1, wherein at its second end the channel means is fastened to the counter channel of the fastening arrangement, the channel means or a part thereof being arranged to move along with transfer movement caused by the tensioning device of the saw chain.

4. An arrangement as claimed in claim 1, wherein the channel means comprises:
   means for mechanically locking the channel means in connection with the feed or counter channel.

5. An arrangement as claimed in claim 4, wherein said means for mechanically locking the channel means consist of a screw thread.

6. An arrangement as claimed in claim 1, wherein the channel means is an integral part of the chain saw body or the fastening arrangement.

7. An arrangement as claimed in claim 1, wherein the channel means is slidingly joined at its ends to the feed channel on a chain saw body side as well as to the opposite counter channel of the fastening arrangement.

8. An arrangement as claimed in claim 6, wherein the channel means comprises:
a limiter member for limiting a length of a travel path in the feed channel and/or the counter channel.

9. An arrangement as claimed in claim 8, wherein the limiter member comprises:
a mechanical limiter, configured as a shoulder in the channel means.

10. An arrangement as claimed in claim 1, wherein the channel means comprises:
at least one seal for sealing a gap between the channel means and the feed channel and/or the counter channel connected thereto, the seal being at least one of an O-ring seal and a lip seal.

11. An arrangement as claimed in claim 1, wherein the channel means is arranged to form a slide guide for the fastening arrangement of the guide bar associated with the chain saw body.

12. An arrangement as claimed in claim 1, wherein the arrangement is configured to provide a substantially uniform channel for guiding lubricant from the chain saw body to the saw chain travelling on the guide bar for lubricating the chain.

13. A chain saw, comprising:
a body;
a guide bar;
an arrangement for transferring fluid to the guide bar, the chain saw having at least a power unit, a chain sprocket driven by the power unit and a saw chain to be rotated along the guide bar thereof, wherein:
the guide bar includes a fastening arrangement with which it is rotatably fastened to the body of the chain saw, and
a tensioning device arranged to act on the guide bar fastening arrangement, for causing in the guide bar a distancing movement in relation to the chain sprocket in a direction of a longitudinal axis of the guide bar for tensioning the saw chain, which
the tensioning device includes at least one transfer member arranged to the chain saw body for causing the movement substantially in the direction of the longitudinal axis of the guide bar, the at least one transfer member being in contact with a counter surface on the guide bar or in the fastening arrangement thereof, and
the fastening arrangement of the guide bar and the chain saw body being joined by at least one support guide to provide the movement of said guide bar in the direction of the longitudinal axis thereof, wherein the arrangement comprises:
a channel means configured for extending from the chain saw body to the fastening arrangement of the guide bar of the chain saw body so that
a direction of a longitudinal axis of the channel means is substantially in a direction of influence of the at least one transfer member of the tensioning device;
the channel means having a cavity therethrough;
a first end of said channel means being configured to be connected to a feed channel provided in the chain saw body; and
a second end of the channel means being configured to be connected to a counter channel provided in the fastening arrangement, the counter channel being arranged to extend into connection with the guide bar; whereby
the channel means is slidingly arranged by ends thereof either to the feed channel in the chain saw body or the counter channel in the fastening arrangement, and
the channel means is arranged to guide fluid flowing in the feed channel provided in the chain saw body through the channel means and to the guide bar through the counter channel provided in the fastening arrangement.

14. A forest machine, comprising:
a harvester head including a chain saw, the chain saw including: a body; a guide bar; a power unit; a chain sprocket driven by the power unit; and a saw chain to be rotated along the guide bar thereof, wherein:
the guide bar includes a fastening arrangement with which it is rotatably fastened to the body of the chain saw, and
a tensioning device is arranged to act on the guide bar fastening arrangement, for causing in the guide bar a distancing movement in relation to the chain sprocket in a direction of a longitudinal axis of the guide bar for tensioning the saw chain, which
tensioning device includes at least one transfer member arranged to the chain saw body for causing the movement substantially in the direction of the longitudinal axis of the guide bar, the at least one transfer member being in contact with a counter surface on the guide bar or in the fastening arrangement thereof, and
the fastening arrangement of the guide bar and the chain saw body being joined by at least one support guide to provide the movement of said guide bar in the direction of the longitudinal axis thereof; and
an arrangement for transferring fluid to the guide bar, the arrangement including:
a channel means configured for extending from the chain saw body to the fastening arrangement of the guide bar of the chain saw body so that a direction of a longitudinal axis of the channel means is substantially in a direction of influence of the at least one transfer member of the tensioning device;
the channel means having a cavity therethrough;
a first end of said channel means being configured to be connected to a feed channel provided in the chain saw body; and
a second end of the channel means being configured to be connected to a counter channel provided in the fastening arrangement, the counter channel being arranged to extend into connection with the guide bar; whereby
the channel means is slidingly arranged by ends thereof either to the feed channel in the chain saw body or the counter channel in the fastening arrangement, and
the channel means is arranged to guide fluid flowing in the feed channel provided in the chain saw body through the channel means and to the guide bar through the counter channel provided in the fastening arrangement.

15. An arrangement as claimed in claim 2, wherein at its second end the channel means is fastened to the counter channel of the fastening arrangement, the channel means or a part thereof being arranged to move along with transfer movement caused by the tensioning device of the saw chain.

16. An arrangement as claimed in claim 15, wherein the channel means comprises:
means for mechanically locking the channel means in connection with the feed or counter channel.

17. An arrangement as claimed in claim 16, wherein said means for mechanically locking the channel means consist of a screw thread.

18. An arrangement as claimed in claim 15, wherein the channel means is an integral part of the chain saw body or the fastening arrangement.

19. An arrangement as claimed in claim 17, wherein the channel means comprises:

at least one seal for sealing a gap between the channel means and the feed channel and/or the counter channel connected thereto, the seal being at least one of an O-ring seal and a lip seal.

20. An arrangement as claimed in claim 19, wherein the channel means is arranged to form a slide guide for the fastening arrangement of the guide bar associated with the chain saw body.

\* \* \* \* \*